UNITED STATES PATENT OFFICE.

EMIL KRAUS, OF FRANKFORT-ON-THE-MAIN, GERMANY, ASSIGNOR TO CASSELLA COLOR COMPANY, OF NEW YORK, N. Y.

BROMINATED INDIGO SULFID AND PROCESS OF MAKING SAME.

No. 920,156.    Specification of Letters Patent.    Patented May 4, 1909.

Application filed February 13, 1909. Serial No. 477,727.

*To all whom it may concern:*

Be it known that I, EMIL KRAUS, doctor of philosophy, a subject of the Empire of Austria-Hungary, and a resident of Frankfort-on-the-Main, in the Province of Hesse-Nassau and Kingdom of Prussia, Germany, have invented some new and useful Improvements in the Production of Brominated Indigo Sulfid and Processes of Making Same, of which the following is a full description.

I have discovered that indigo, when being heated with sulfur in the presence of a suitable diluting agent, such as for instance nitrobenzol, chlorbenzol, etc. to temperatures exceeding 160° C., is transformed into indigo sulfids, which are technically important especially in the form of their halogen derivatives. Of particular importance are the products which are obtained by the simultaneous reaction of bromin and sulfur on indigo. According to the analytical result, they contain one atom of sulfur on two molecules of indigo, the contents of bromin varying with the quantity of bromin employed. The resulting dyestuffs may be vat-dyed quite well, and dyeings so obtained, are distinguished by a considerably purer shade, and better fastness to washing and chloring, when compared with indigo. Compared with the brom-indigo derivatives, they are of a more greenish shade, and particularly of a superior fastness to light.

The process is illustrated by the following example: 15 kilos indigo are suspended in 50 kilos nitrobenzol, to which is added, under constant stirring in the cold, the solution of 32 kilos bromin and 50 kilos nitrobenzol. 1.8 kilos sublimed sulfur are then added, and the whole is allowed to stand for about 12 hours at ordinary temperature. It is then heated gradually to 120° C., while stirring, this temperature maintained for about 4 hours, after which it is raised to 180° C., and the melt stirred at 180-200° C., until the formation of hydrobromic acid has ceased (which will be in about 1½ hours). The dyestuff is then filtered off, washed with benzol or alcohol, or the nitro-benzol is distilled off, to best advantage in a vacuum.

The new dyestuff forms a dark blue powder almost insoluble in alcohol, benzol, chloroform; soluble in boiling nitrobenzol and naphthalene with a greenish-blue color, in concentrated sulfuric acid with a bluish-green, in oleum of 20% with a sky-blue color. It dissolves by means of hydrosulfites, forming a yellow vat from which cotton is dyed clear, blue shades. According to the analysis it corresponds to the formula of a tri-bromin-indigo sulfid $[(C_{16}H_6N_2O_2Br_3)_2S]$.

Having now particularly described and ascertained the nature of my said invention and in what manner the same is to be performed I declare that what I claim is:—

1. The process of producing brominated indigo sulfids by heating indigo in the presence of suitable diluting agents with sulfur and bromin substantially as described.

2. The brominated indigo sulfid, which is a dark blue powder almost insoluble in alcohol, benzol, chloroform, soluble in boiling nitrobenzol and naphthalene with a greenish-blue color, in a concentrated sulfuric acid with a bluish-green, in oleum of 20% with a sky-blue color, dissolving by means of hydrosulfites, forming a yellow vat from which cotton is dyed clear, blue shades, substantially as described.

In witness whereof I have hereunto signed my name this 29th day of January, 1909, in the presence of two subscribing witnesses.

EMIL KRAUS.

Witnesses:
    FRITZ FAENICH,
    JEAN GRUND.